UNITED STATES PATENT OFFICE.

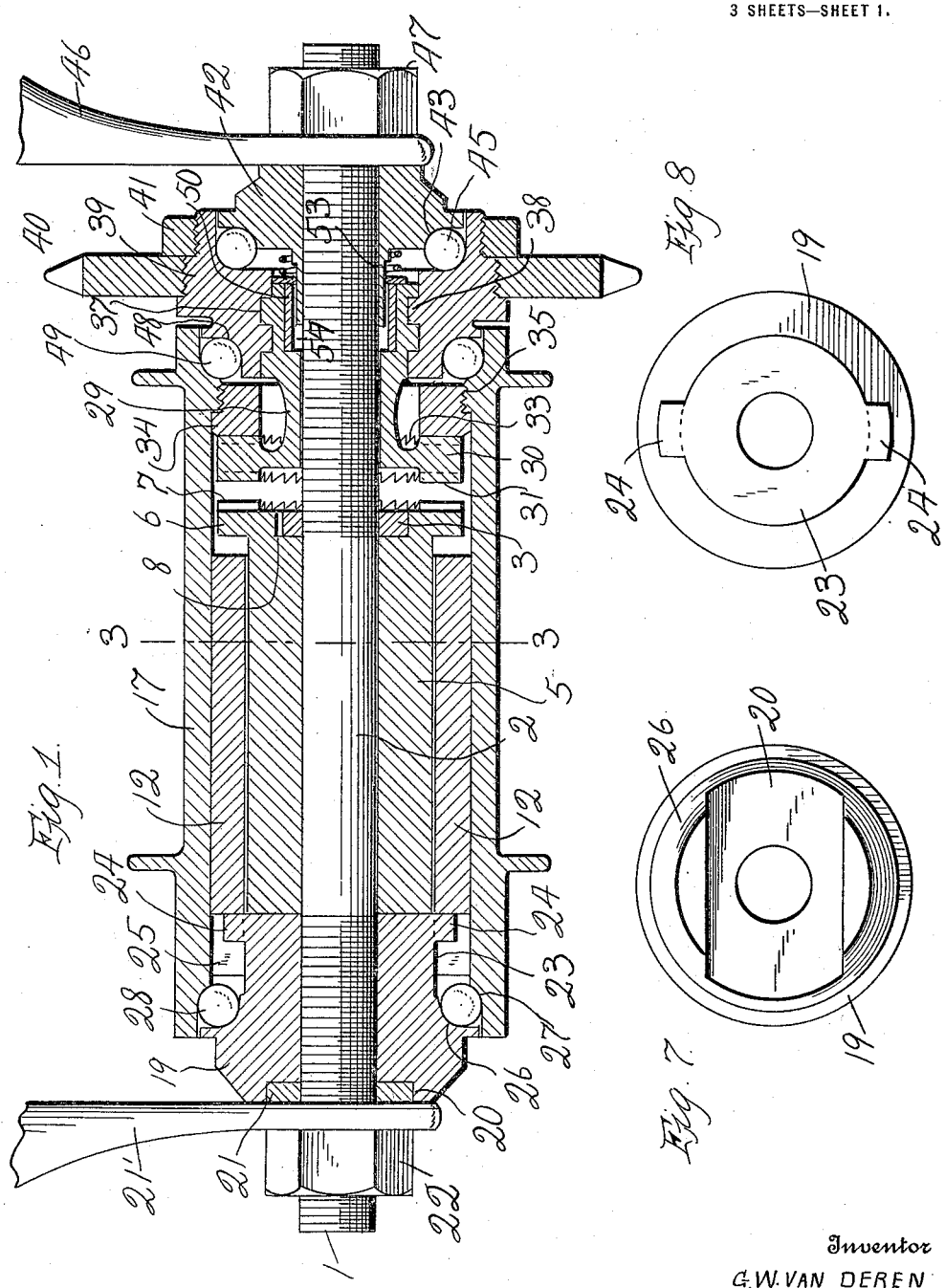

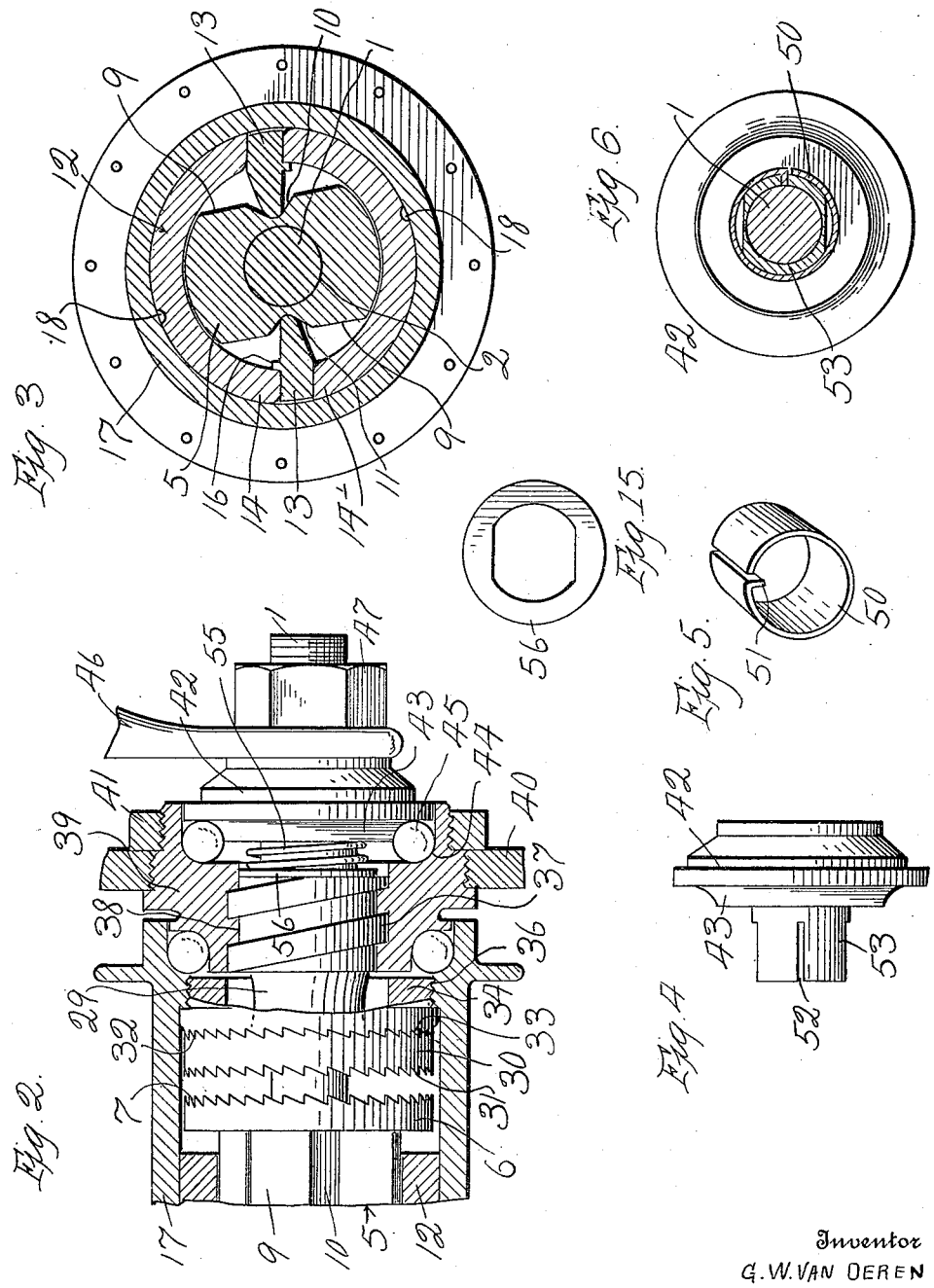

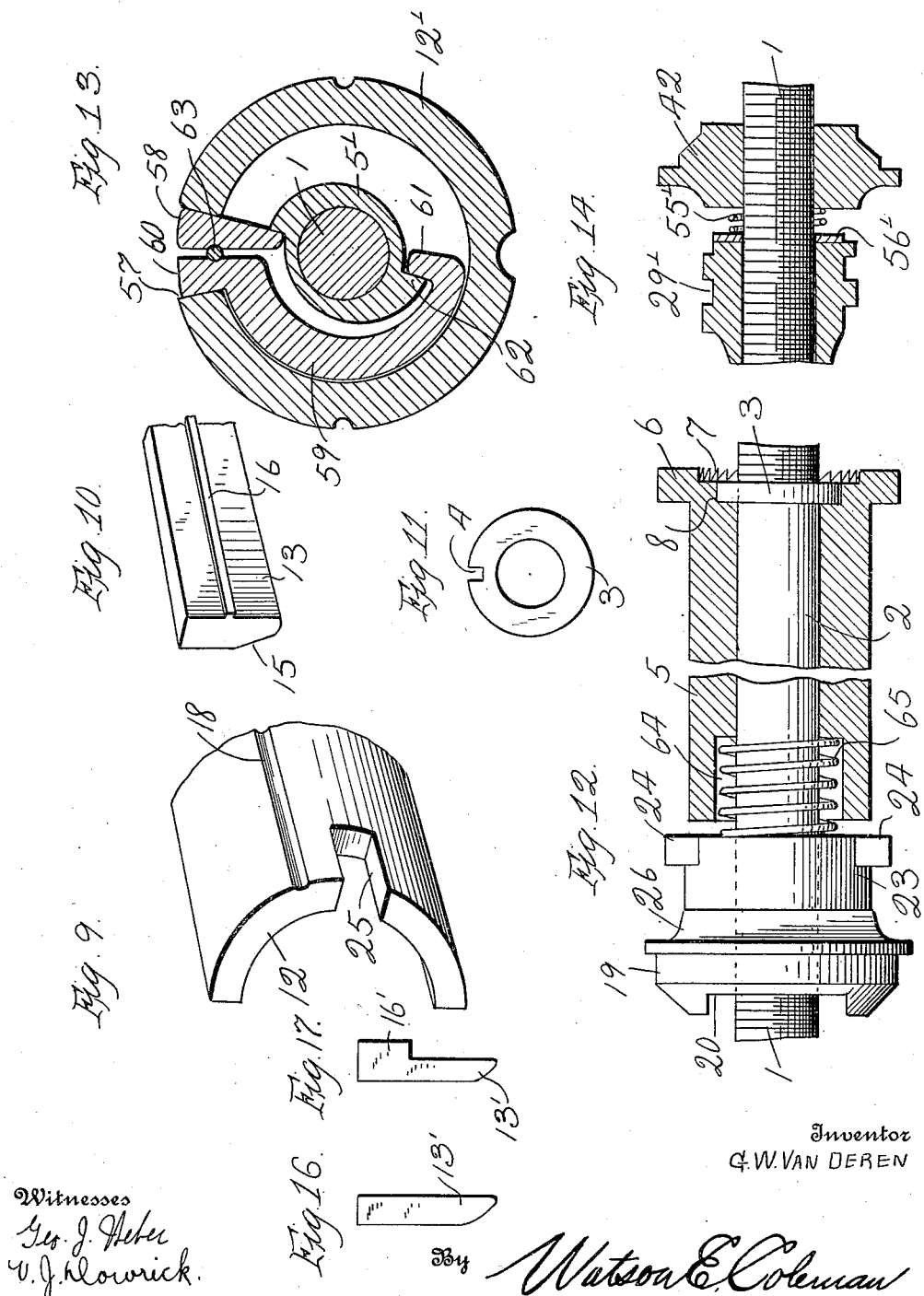

GEORGE W. VAN DEREN, OF ELMIRA, NEW YORK.

COASTER-BRAKE.

1,139,145.  Specification of Letters Patent.   Patented May 11, 1915.

Application filed November 5, 1913. Serial No. 799,361.

*To all whom it may concern:*

Be it known that I, GEORGE W. VAN DEREN, a citizen of the United States, residing at Elmira, in the county of Chemung and State of New York, have invented certain new and useful Improvements in Coaster-Brakes, of which the following is a specification, reference being had to the accompanying drawings.

This invention relates to new and useful improvements in coaster brakes for vehicles and the like, the object of the invention being to provide an improved structure in which a maximum braking surface is provided without changing the longitudinal surface of the ordinary hub.

Another object of the invention is the provision of a coaster brake which is largely used upon the hub of the rear wheel of a bicycle and is especially designed to be controlled by the rider for the purpose of rotating the wheel and propelling the bicycle forwardly or to permit the wheel to revolve freely or to brake the wheel and retard or check the movement of the bicycle.

A further object of the invention is the provision of an improved coaster brake which will utilize a large brake surface without injury to any of the parts whereby a quicker and better braking action will result.

A still further object of the invention is the provision of a device of the above character which will possess advantages in points of efficiency and durability, is inexpensive of manufacture and at the same time is simple in construction and operation.

With the above and other objects in view, the invention consists in the novel features of construction and the combination and arrangement of parts to be hereinafter more fully described, pointed out in the claims and shown in the accompanying drawings, in which—

Figure 1 is a longitudinal sectional view of a coaster brake constructed in accordance with my invention; Fig. 2 is a longitudinal sectional view of one end of the device, parts thereof being shown in elevation; Fig. 3 is a transverse sectional view taken on the line 3—3 of Fig. 1; Fig. 4 is an elevation of one of the cone members; Fig. 5 is a detail perspective view of the retarding spring; Fig. 6 is a transverse sectional view illustrating the position of the retarding spring; Fig. 7 is an end elevation of the opposite cone member taken from the outer end thereof; Fig. 8 is a view of the same cone member as shown in Fig. 7 illustrating the opposite end thereof; Fig. 9 is a detail perspective view of one end of one section of a brake shoe; Fig. 10 is a detail perspective view of one of the brake levers; Fig. 11 is an end elevation of the stop flange; Fig. 12 is a longitudinal sectional view of the inner hub member illustrating a modified form of the same; Fig. 13 is a transverse sectional view of the brake shoe illustrating a slightly modified form of the same; Fig. 14 is a longitudinal sectional view illustrating a modified form of retarding means. Fig. 15 is a plan view of the washer which is mounted upon the retarding spring; Fig. 16 is an end elevation illustrating a slightly modified form of braking lever and Fig. 17 is an end elevation illustrating still another modified form of a braking lever.

Referring more particularly to the drawings, 1 indicates the stationary axle threaded at each end and is adapted to be locked within the rear forks of the bicycle. The axle is provided at its intermediate portion with a smooth surface 2 and threaded upon the axle 1 is a stop nut 3 which is provided in its periphery with a transverse recess 4 adapted to be engaged by any suitable form of wrench whereby the stop nut may be readily removed or secured upon the axle. As illustrated in the accompanying drawings, it is preferred that the stop nut be arranged at one side of the center of the axle.

Rotatably mounted upon the smooth portion of the axle 1 and adapted for rotation is an inner hub member 5 which is provided at one end with a clutch head 6 preferably formed by providing an annular flange upon the end of the hub and forming a plurality of teeth 7 upon the outer face of the flange, as clearly illustrated in Fig. 2. The clutch head is provided upon its inner periphery with an annular recess 8 which is adapted to receive the stop nut 3 upon the axle 1 to limit longitudinal movement of the hub upon the axle. The inner hub member 5 is provided upon opposite sides thereof with the flattened faces 9 which are further provided with longitudinal grooves 10, one of the side walls of which is curved as shown at 11 outwardly toward the flattened faces 9.

Mounted upon the inner hub member 5 is a sectional brake shoe 12 which is preferably cylindrical in form, thus each of the sections will be of substantially circular form and the longitudinal edges thereof will be arranged in spaced relation and retained in such position by means of the longitudinally extending lever plates 13 which are adapted to be arranged between the edges of the sections 14 and 14' of the brake shoes 12. The longitudinal braking levers 13 are provided with a tapering portion 15 which projects inwardly into the body of the brake shoe and the inner longitudinal edges thereof are adapted to be arranged within the longitudinal grooves 10. One face of each of the braking levers is preferably perpendicular with respect to the walls of the grooves 10, said perpendicular faces to be approximately opposite each other and adapted to engage the walls of the grooves, the other face of the longitudinal edges of the braking levers being beveled to coincide with the inclined portion 11 of the grooves 10. The braking levers are provided upon one face with a longitudinal rib 16 which is arranged upon the inner side of the braking shoe and engages the inner wall thereof to prevent outward movement of the levers.

From this it will be seen that upon rotation of the inner hub, the walls of the grooves 10 will engage the perpendicular faces of the levers 13 conveying a sidewise movement to the levers and forcing the longitudinal edges of the brake shoe apart so that the outer peripheries thereof will frictionally engage the inner periphery of the outer hub 7 and prevent rotation of the wheel. It will be apparent that upon actuation of the braking levers 13, the entire outer periphery of the brake shoe 12 will be frictionally engaged with the inner periphery of the outer hub 17.

The periphery of the brake shoe 12 is provided with a plurality of longitudinal grooves 18 adapted to retain the lubricant which may be applied at various intervals. Threaded upon one end of the axle 1 is a cone member 19 having in its outer end a transverse groove 20 which is adapted to receive the inner end of the side arm 21 to retain the cone against movement upon the axle, the fork 21' being retained in position by means of the nut 22 which is threaded upon the outer end of the axle and is adapted to tightly engage the lower end of the fork to retain the same in position. Formed integral with the cone 19 is an inwardly extending sleeve 23 upon the inner end of which is formed the oppositely disposed lugs 24 adapted to be arranged within the recesses 25 formed within one end of the brake shoes 12. Formed upon the inner face of the cone 19 is an annular raceway 26 which is arranged in opposed relation with the raceway 27 and between which the ball bearings 28 are adapted to be arranged and upon which the outer hub member 17 is adapted to rotate.

Rotatably mounted upon the axle 1 and arranged in opposed relation with the inner hub member 5 is a sleeve 29 which is provided at one end with a clutch head 30 provided upon its inner face with a series of teeth 31 which are adapted to co-act with the teeth 7 upon the inner hub member 5 to rotate said hub member when desired. The outer face of the clutch head 30 is provided with a second series of teeth 32 adapted for engagement with the teeth 33 formed upon the inner face of the collar 34, the periphery of said collar being provided a suitable distance with screw threads 35 which are adapted to engage the screw threads 36 formed upon the inner periphery of the hub member 17 adjacent one end thereof.

The end of the sleeve 29 opposite the clutch head 30 is provided upon its periphery with the threads 37 which are adapted to co-act with the threads 38 formed on the collar 39 to move the sleeve 29 longitudinally upon the rotation of the collar to engage the teeth upon the clutch head 30 with the teeth 7 on the inner hub or the teeth 33 upon the collar 34. Mounted upon the outer face of the collar 39 and adapted to rotate therewith is a sprocket 40 which is securely retained in position by means of a nut 41 threaded upon the outer end of the collar.

Mounted upon the end of the axle 1 opposite the cone 19 is a second cone 42 which is provided with a curved raceway 43 arranged in opposed relation with the raceway 44 formed in the outer end of the collar 39 and between which the ball bearings 45 are to be arranged so that the collar 39 will readily ride upon the axle. Mounted upon the axle 1 adjacent the outer end of the cone 42 is the lower end of the fork 46 which is securely held in position by means of the nut 47 threaded upon the end of the axle. The inner end of the collar 39 is provided with a curved raceway 48 adapted to be arranged in opposed relation with a similar raceway formed in the end of the outer hub member 17 and between which the ball bearings 49 are arranged so that when it is desired, the hub member 17 may be rotated freely upon the axle 1.

From the above it will be readily apparent during the forward movement of the vehicle and the rotation of the sprocket 40, the teeth 32 upon the clutch head 30 will engage with the teeth 33 on the roller 34 and rotate the outer hub member 17 which in turn will rotate the entire wheel. Should it be desired to allow the pedals of the wheel to remain stationary during forward movement of the vehicle, it will be apparent that the momentum of the wheel will force the sleeve 29 longitudinally upon the axle 1 so that the teeth 31 disengage from the teeth 33 to permit the hub 17 to rotate freely without the rotation of the sprocket 40.

In order to retain the sleeve 29 against unnecessary rotation, I provide a retarding member 50 which is preferably in the form of a metal sleeve which is slit longitudinally and provided upon one side of the slit with an inwardly extending flange 51 which is adapted to be normally engaged within the slot 52 formed longitudinally within the sleeve 53, said sleeve being integrally formed with the cone 42. The sleeve 50 is adapted to be arranged within the annular recess 54 formed within the outer end of the sleeve 29 and the periphery of the sleeve 50 is adapted to frictionally engage with the inner periphery of the recess 54 so as to retard the rotary movement of the sleeve 29.

Mounted upon the sleeve 53 is a coil spring 55 and arranged between the coil spring and the sleeve 50 is a washer 56 which is adapted to normally bear against the outer end of the sleeve 29 and to reduce the friction between the sleeve 50 and the coil spring. From this it will be apparent that when forward rotary movement of the sprocket 40 is stopped, the coil spring 55 will assist in moving the sleeve 29 longitudinally so that the teeth 31 will engage with the teeth 7 upon the hub member 5 and permit the outer hub member 17 to rotate freely upon the axle.

In the practical operation of my improved coaster brake, it will be readily apparent that in propelling the wheel forward, the sprocket 40 is rotated in a direction so that the clutch head 30 will be engaged with the collar 34 so as to impart motion to the outer hub 17 and the wheel mounted thereon. Should it be desired to let the pedals remain idle, the sleeve 29 will be moved longitudinally upon the axle 1 by the momentum of the wheel in motion so as to disengage the clutch head 30 from the sleeve 34 and allow the outer hub 17 to rotate freely upon the ball bearings 28 and 49. Should it be desired to apply the brake to the wheel so that the same will come to a full stop, the sleeve 29 is rotated through the medium of the sprocket 40 so that the inner hub member 5 will also be rotated to impart movement to the braking levers 13 and force the sections of the brake shoe 20 into frictional engagement with the inner periphery of the hub barrel 17. It will be readily understood that the engagement of the brake shoe with the hub barrel may be readily released by forward movement of the sprocket 40 so that the sleeve 29 will be returned to its normal position.

In Fig. 13, I have illustrated a slightly modified form of means for applying the brakes to the hub barrel. In this form of the invention, I prefer to construct the brake shoe 12' of a single piece of material and slit longitudinally upon one side thereof, as shown at 57. Arranged within the slit 57 is a tapering wedge member 58 and a clutch member 59 is provided which is preferably semicircular in form and adapted to be arranged within the brake shoe 12'. One of the longitudinal edges of the clutch member 59 is provided with an outwardly extending tapering flange 60 which is adapted to be arranged between one edge of the brake shoe and the tapering wedge 58, the purpose of which will be hereinafter more fully set forth. The longitudinal edge of the clutch member 59 adjacent the tapering portion 60 is provided with a hook portion 61 which is adapted to engage one of the oppositely disposed longitudinal shoulders 62 formed upon the periphery of the inner hub member 5'. Arranged between the tapering portion 60 and the wedge 58 is a roller 63 which extends longitudinally the entire length of the brake shoe. The lower longitudinal edge of the tapering wedge 58 is adapted to be arranged adjacent one of the shoulders 62 and to be engaged thereby upon the rotation of the inner hub member 5'. From this it will be apparent that upon the rotation of the hub member 5', the hook 61 will be engaged pulling the tapering portion 60 inwardly and at the same time the lower longitudinal edge of the web 58 will also be engaged, pushing the same to one side toward the clutch member 59 and expanding the brake shoe 12' so that the periphery thereof will frictionally engage with the inner wall of the hub barrel 17. It will be apparent that by having the roller 63 arranged between the two tapering portions, a slight oscillatory movement will be imparted to the wedge member 58 so that the body of the brake shoe 12' may be readily expanded upon the rotation of the inner hub member 5.

In Fig. 14, I have illustrated a slightly modified form wherein the spring retarding member 50 is eliminated. In this form of the invention, the sleeve 53 upon the inner end of the cone 42 is also eliminated and the spring 55' is adapted to bear against the inner end of the cone and arranged between the other end of the spring and the end of the sleeve 29' is a washer 56'. In this form of the invention, I prefer to provide the outer end of the inner hub member 5 with an annular recess 64 in which is arranged a coil spring 65, the outer end of which is adapted to bear against the inner end of the sleeve 23 so that as soon as the backward pressure on the sprocket 40 is released, the spring 65 which has been previously placed under tension by the longitudinal movement of the hub 5 will return the clutch head 30 to its normal position or to a position whereby the teeth 32 of the clutch head will engage the teeth 33 formed on the collar 34 so that upon forward movement of the sprocket 40 the outer hub barrel 17 will be rotated. From the above it will be readily apparent that when the spring retarding member 50 is eliminated, a coil spring is to be arranged between the inner hub member 5 and the cone 19 so that the clutch head 30 will be returned to its normal position after braking pressure has been released. From the above description taken in connection with the accompanying drawings, it will be readily apparent that I have provided a simple and durable coaster brake wherein a large braking surface is utilized without injury to any of the parts of the brake and whereby a quicker and better braking action will result. It will also be apparent that my device is extremely simple in construction and can be manufactured at a comparatively low cost.

In Fig. 16, I have illustrated a slightly modified form of braking lever 13′ wherein the longitudinal rib 16 is eliminated, it being understood that the outer hub member 17 will retain the braking levers in their operative positions. In Fig. 17, I have illustrated still another form of the invention wherein one of the longitudinal edges of the braking levers is provided with the reinforced portion 16′ which is arranged between the edges of each section of the brake shoe so that when the inner hub member 5 is rotated, the sections will be forced farther apart than by the forms illustrated in Figs. 10 and 16.

While I have shown and described the preferred form of my invention, it will be obvious that various changes in the details of construction and in the proportions may be resorted to for successfully carrying my invention into practice without sacrificing any of the novel features or departing from the scope of the appended claims.

What I claim is:—

1. A coaster brake including a hub formed with a barrel, a sectional brake shoe including semicircular sections adapted to engage said barrel, said shoe having opposed recesses formed in the ends thereof, a cone member arranged within the hub, opposed lugs formed upon the inner end of the cone member and adapted to be disposed within said recesses to retain the brake shoe against rotation, longitudinal levers arranged between each section of the brake shoe and means for actuating said levers to expand the shoe against the inner periphery of the barrel.

2. A device of the class described including a hub formed with a barrel, a sectional brake shoe including semicircular sections adapted to engage said barrel, said shoe having opposed recesses formed in the ends thereof, a cone member arranged within the hub, opposed lugs formed upon the inner end of the cone member and adapted to be disposed within said recesses to retain the brake shoe against rotation, longitudinal levers arranged between each section of the shoe, longitudinal lugs formed on said levers to prevent outward movement of the same, and means for actuating said levers to expand said sections against the inner periphery of the barrel.

3. A device of the class described including a hub formed with a barrel, a sectional brake shoe including semicircular sections adapted to engage said barrel, said shoe having opposed recesses formed in the ends thereof, a cone member arranged within the hub, opposed lugs formed upon the inner end of the cone member and adapted to be disposed within said recesses to retain the brake shoe against rotation, longitudinal levers arranged between the longitudinal edges of said sections, an inner hub member having longitudinal recesses to receive the inner longitudinal edges of the brake levers, whereby rotary movement of the inner hub member will actuate said levers and expand the shoe against the inner periphery of the barrel.

4. A coaster brake including a hub formed with a barrel, a sectional brake shoe including semicircular sections adapted to engage said barrel, said shoe having opposed recesses formed in the ends thereof, a cone member arranged within the hub, opposed lugs formed upon the inner end of the cone member and adapted to be disposed within said recesses to retain the brake shoe against rotation, longitudinal brake levers arranged between the longitudinal edges of said sections, stop lugs formed on said levers to prevent outward movement of the same, an inner hub member having longitudinal recesses to receive the inner longitudinal edges of the brake levers, and means for rotating said inner hub member to actuate the brake levers and expand the sections of said shoe against the inner periphery of the barrel.

5. A coaster brake including a hub formed with a barrel, a sectional brake shoe including semicircular sections adapted to engage said barrel, said shoe having opposed recesses formed in the ends thereof, a cone member arranged within the hub, opposed lugs formed upon the inner end of the cone member and adapted to be disposed within said recesses to retain the brake shoe against rotation, brake levers arranged between the longitudinal edges of said sections, stop lugs formed on said levers to prevent outward movement of the same, an inner hub member having opposed flattened faces provided with longitudinal grooves adapted to receive the inner longitudinal edges of said brake levers, and means for rotating said inner hub member to actuate the brake levers and expand the shoe against the inner periphery of the barrel.

6. A coaster brake including a hub formed with a barrel, a sectional brake shoe including semicircular sections adapted to engage said barrel, each of said sections being formed at one end with a recess, a cone arranged within one end of the barrel, means whereby to retain said cone against movement, opposed lugs formed upon the inner end of said cone and adapted to be arranged within said recesses to prevent rotary movement of the brake shoe, brake levers arranged between the longitudinal edges of the sections of the brake shoe and means for actuating said levers to expand the sections of the brake shoe against the inner periphery of the barrel.

7. A coaster brake including a hub formed with a barrel, a sectional brake shoe including semicircular sections adapted to engage said barrel, said shoe having opposed recesses formed in the ends thereof, a cone member arranged within the hub, opposed lugs formed upon the inner end of the cone member and adapted to be disposed within said recesses to retain the brake shoe against rotation, brake levers arranged between the longitudinal edges of said sections, an inner hub member having opposed flattened faces provided with longitudinal recesses to receive the inner longitudinal edges of the brake levers, a clutch head formed upon one end of said hub, and means adapted for engagement with said clutch head to impart rotary movement to the hub member or actuate said levers to expand the brake shoe against the inner periphery of the barrel.

8. A coaster brake including an axle, a central smooth portion thereon, an annular stop nut threaded on said axle at one end of said smooth portion, a hub formed with a barrel, a sectional brake shoe adapted to engage said barrel, means for retaining said brake shoe against rotation, an inner hub member mounted upon said axle and provided at one end with an interior recess to receive the stop nut on said axle, and means carried by the brake shoe and adapted to be actuated by the rotary movement of the inner hub member to expand the brake shoe against the inner periphery of the barrel.

9. A coaster brake including an axle, a sleeve mounted thereon, a clutch head formed at one end of the sleeve, an enlarged portion formed at the other end of the sleeve and provided with exterior threads, means engaging said threads, adapted to be rotated and actuate the clutch head, the enlarged portion of said sleeve being formed with an interior annular recess, a resilient slit sleeve arranged within said recess and having one of its longitudinal edges inwardly turned, a cone upon said axle, a sleeve formed integral with the cone and provided with a longitudinal recess to receive the inwardly turned edge of the slit sleeve, and a coil spring mounted upon the sleeve of the cone and arranged between the first sleeve and said cone, as and for the purpose set forth.

10. A coaster brake including an axle, a sleeve mounted thereon, a driving collar mounted upon the sleeve, threaded connection between said collar and sleeve, a clutch head formed at one end of the sleeve, said sleeve having an interior annular recess at the other end, a retarding member including a metal sleeve slit longitudinally and having one side of the slit portion bent inwardly to form a flange, said sleeve being adapted to be arranged within said recess, a cone member mounted upon the axle, a sleeve formed integral with the cone and provided with a longitudinal slot to receive said flange, a washer mounted upon the last mentioned sleeve and a coil spring mounted upon said last mentioned sleeve and arranged between the washer and the inner face of the cone, as and for the purpose set forth.

11. A coaster brake including a hub formed with a barrel, an expansive brake shoe arranged within said hub and adapted to engage the barrel, means for retaining said brake shoe against rotation, an axle, a central smooth portion thereon, an annular stop nut threaded on said axle at one end of the smooth portion, an inner hub member having an annular recess formed within one end thereof to receive said stop nut, means for rotating the inner hub member and means carried by the brake shoe and adapted for engagement by the inner hub member whereby the rotary movement of said hub member will expand said brake shoe against the inner periphery of the barrel.

In testimony whereof I hereunto affix my signature in the presence of two witnesses.

GEORGE W. VAN DEREN.

Witnesses:
HELEN M. BEMENT,
HARRY D. HEMENWAY.